United States Patent Office 3,406,150
Patented Oct. 15, 1968

3,406,150
LOW MOLECULAR WEIGHT EPOXIDIZED RESORCINOL NOVOLAC RESIN HAVING HIGH FUNCTIONALITY
Theodore S. Boozalis, Lake Jackson, Tex., assignor to The Dow Chemical Company, Midland, Mich., a corporation of Delaware
No Drawing. Filed Mar. 4, 1965, Ser. No. 437,305
3 Claims. (Cl. 260—54)

ABSTRACT OF THE DISCLOSURE

The present invention is concerned with an epoxidized novolac resin having a low viscosity at casting temperatures and a high functionality and comprising the epoxidized tetrafunctional novolac of resorcinol and formaldehyde.

---

This invention concerns an epoxy resin and a method of producing the resin. More particularly the invention relates to an epoxy resin produced by the epoxidation of the substantially tetrafunctional novolac of resorcinol and formaldehyde.

There has been a long standing need for an epoxy resin having a low viscosity at casting and molding temperatures and having a high order of functionality so that the resin can be cured to a thermoset product having superior physical and chemical properties. Resins used for potting and encapsulation must melt and flow rather freely to insure complete filling of the voids with the resin prior to curing. Solvents cannot be used in most instances owing to the difficulty of solvent removal prior to curing of the resin.

It has been known for many years that epoxy resins can be produced by reacting an epihalohydrin with various polyhydric phenols, including the novolacs of formaldehyde and various phenolic compounds. The high molecular weight polyfunctional epoxidized novolacs are capable of extensive cross-linking to obtain extremely hard and resistant products, however, the utility of the uncured resin is hindered by its high melting point and melt viscosity as well as the rapid gelation which develops during the curing step.

The epoxidized novolac resin produced according to this invention can be heated and mixed with a curing agent to obtain a low viscosity thermosettable mixture. When the resin is fully cured, the product has a high heat distortion temperature and is extremely resistant to strong chemical agents.

The resin which is the subject of this invention can be represented by the following structural formula:

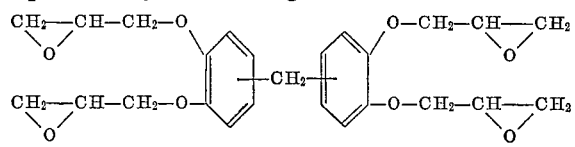

This resin is produced by the epoxidation of the resorcinol-formaldehyde novolac resin by any of the methods commonly used in the preparation of epoxy resins. The critical part of the entire process resides in the preparation and processing of the novolac to obtain the tetrafunctional novolac in high yield and avoid the formation of significant quantities of byproducts having more than two resorcinol moieties and more than four hydroxyl groups.

The novolac can be produced by reacting resorcinol with formaldehyde which can be present either as an aqueous solution, or as paraformaldehyde, or trioxane. The reaction mixture should contain a substantial excess of the resorcinol, preferably at least five moles of resorcinol per mole of formaldehyde, to obtain the desired novolac in good yield. The reaction can be carried out at a temperature from about 70 to about 120° C., and preferably between 90 and 110° C. Additionally, the product novolac should not be subjected to temperatures above about 170° C. in separating the product from the unreacted resorcinol. The novolac product tends to dissociate at higher temperatures, releasing resorcinol and forming polymeric materials.

The polyepoxide can be produced by reacting the novolac with epichlorohydrin or other epihalohydrin in the presence of a strong base such as an alkali metal hydroxide, or a mixture of an alkali metal hydroxide and sodium carbonate, in the customary manner of producing polyglycidyl ethers of other polyhydric phenols such as 2,2-bis(4-hydroxyphenyl)propane as taught, for example, in U.S. Patent 2,467,171. To promote the formation of the tetraglycidyl derivative of the novolac and prevent the etherification of phenolic hydroxyl groups by the oxirane groups, it is desirable to epoxidize the novolac in a solution containing at least 3 and preferably 5 moles of the epihalohydrin per equivalent of phenolic hydroxyl group.

The method of preparing these resins can be illustrated by the following example.

Example 1

A novolac resin was prepared by dissolving 7700 grams (70 moles) of resorcinol in 1500 ml. of water at 60–65° C. To this was added 1136 grams (14 moles) of 37% aqueous formaldehyde solution with stirring at 60° C. The temperature of the mixture rose to 100–105° C. over the next 10–15 minutes and this temperature was maintained for 30 minutes. A solution of 44.4 grams of oxalic acid in 300 ml. of water was then added as a catalyst and the reaction continued for another 30 minutes at the same temperature. Thereafter the water and excess resorcinol were distilled from the novolac at temperatures below 170° C. and at an absolute pressure below 3 mm. Hg. The yield was substantially 100% of theory of the tetrafunctional novolac.

The novolac was then dissolved in epichlorohydrin, using a 5:1 mole ratio of epichlorohydrin to phenolic hydroxyl group. A 50% aqueous sodium hydroxide solution at 100–105° C. was added over a period of about 2.5 hours. The amount of sodium hydroxide added was equal to about 1.1 times the equivalents of phenolic hydroxyl groups. As the reaction proceeded, an azeotrope of water and epichlorohydrin was removed, condensed, separated and the epichlorohydrin recycled to the reactor. Upon completion of the epoxidation, the byproduct sodium chloride was removed by filtration then the product was water-washed and the excess epichlorohydrin removed by distillation at 145° C. at 2 mm. Hg absolute pressure.

The polyepoxide had the following properties:

Epoxide equivalent weight _____ 135
Durran's softening point, ° C. _____ 42
Viscosity, centipoises at 75° C. _____ 4,720
Specific gravity, 25/4 _____ 1.294
Molecular weight (boiling point elevation in dioxane) _____ 560

A quantity of the epoxidized resorcinol-formaldehyde resin was cured with a stoichiometric amount of p,p'-methylene dianiline, producing a highly crosslinked, dense product having a heat distortion temperature above 300° C. A sample of the cured resin immersed in concentrated nitric acid at 50° C. for more than 24 hours lost only 35% of its weight whereas a cured sample of a polyglycidyl ether of a phenol-formaldehyde novolac was completely decomposed.

Although it is preferred to use epichlorohydrin in the epoxidation of the novolac, other epihalohydrins can be used. Exemplary of such epihalohydrins are epibromohydrin, glycerol dichlorohydrin, glycerol dibromohydrin, and the like.

The theoretical epoxide equivalent weight of the tetraglycidyl ether of the resorcinol-formaldehyde novolac is 114, however the polyglycidyl ethers of resorcinol-formaldehyde novolacs having epoxide equivalent weights up to about 140 have the desirable properties of low viscosity at casting temperatures and the ability to cure to a hard, resistant material.

The desirable high temperature properties of these resins are obtained when they are crosslinked to a thermost material with an aromatic polyamine or an aromatic anhydride, although any of the other common curing agents for epoxy resins can be used when optimum high temperature properties are not required. Aromatic amines which can be used are methylene dianiline, metaphenylene diamine and diamino diphenyl sulfone. Suitable anhydrides for resins having good properties at high temperatures are phthalic anhydride, hexahydrophthalic anhydride, hexachloroendomethylene tetrahydrophthalic anhydride and the maleic anhydride adduct of methyl cyclopentadiene.

I claim:

1. The method of producing a thermosettable epoxidized novolac resin having an equivalent weight less than 140 and a low viscosity at casting temperatures comprising: condensing resorcinol with formaldehyde in an aqueous reaction mixture containing at least five moles of resorcinol per mole of formaldehyde at a temperature between about 70 and about 120° C. to obtain a low molecular weight resorcinol-formaldehyde novolac which is relatively free of novolac molecules containing other than four functional groups; separating said novolac from said reaction mixture at a reduced pressure of less than 3 millimeters mercury and at a temperature below about 170° C.; then reacting said novolac with an epihalohydrin in the presence of an aqueous alkali metal hydroxide solution and recovering said epoxidized novolac resin therefrom.

2. The method according to claim 1 wherein said epihalohydrin is epichlorohydrin.

3. The method of producing an epoxidized novolac resin having an epoxide equivalent weight between 114 and about 140 comprising: condensing resorcinol with formaldehyde in an aqueous reaction mixture containing at least five moles of resorcinol per mole of formaldehyde at a temperature between 90 and 110° C. to obtain a product consisting of substantially a low molecular weight tetrafunctional novolac of resorcinol and formaldehyde; distilling the unreacted resorcinol from said novolac at a reduced pressure of less than 3 millimeters mercury and at a temperature below 170° C.; then reacting said novolac with epichlorohydrin in the presence of sodium hydroxide and recovering said epoxidized novolac.

References Cited

UNITED STATES PATENTS

| 2,892,809 | 6/1959 | St. Clair | 260—54 |
| 3,063,965 | 11/1962 | Colclough | 260—59 |
| 3,133,034 | 5/1964 | St. Clair | 260—29.3 |
| 3,310,530 | 3/1967 | White | 260—47 |

OTHER REFERENCES

Carswell: Phenoplasts, 1947, pp. 29–35.

WILLIAM H. SHORT, *Primary Examiner.*

H. SCHAIN, *Assistant Examiner.*